United States Patent
Bolik et al.

(10) Patent No.: US 7,660,836 B2
(45) Date of Patent: Feb. 9, 2010

(54) CONTROLLING INCREMENTAL BACKUPS USING OPAQUE OBJECT ATTRIBUTES

(75) Inventors: Christian Bolik, Oldenburg (DE); Venkateswararao Jujjuri, Beaverton, OR (US); Alexei Kojenov, Beaverton, OR (US); Malahal R. Naineni, Tigard, OR (US); Ninad S. Palsule, Beaverton, OR (US); James John Seeger, Portland, OR (US); James Patrick Smith, Redwood City, CA (US); Jason Christopher Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 11/372,816

(22) Filed: Mar. 9, 2006

(65) Prior Publication Data

US 2007/0214197 A1   Sep. 13, 2007

(51) Int. Cl.
 G06F 12/00 (2006.01)
 G06F 17/30 (2006.01)
(52) U.S. Cl. ............. 707/204; 709/231; 711/162
(58) Field of Classification Search .............. 707/204
 See application file for complete search history.

(56) References Cited

U.S. PATENT DOCUMENTS

| | | | | |
|---|---|---|---|---|
| 5,559,991 A | * | 9/1996 | Kanfi | 711/162 |
| 5,778,395 A | * | 7/1998 | Whiting et al. | 707/204 |
| 5,990,810 A | * | 11/1999 | Williams | 341/51 |
| 6,286,015 B1 | * | 9/2001 | Govindarajan et al. | 707/201 |
| 6,625,625 B1 | * | 9/2003 | Kihara et al. | 707/204 |
| 6,865,655 B1 | | 3/2005 | Andersen | |
| 7,024,531 B2 | * | 4/2006 | Saika | 711/162 |
| 7,124,322 B1 | * | 10/2006 | Backman | 714/15 |
| 7,289,974 B2 | * | 10/2007 | Godeby et al. | 707/1 |
| 2004/0210608 A1 | | 10/2004 | Lee et al. | |
| 2004/0236958 A1 | | 11/2004 | Teicher et al. | |
| 2004/0268068 A1 | * | 12/2004 | Curran et al. | 711/162 |
| 2005/0038836 A1 | | 2/2005 | Wang | |
| 2005/0086241 A1 | | 4/2005 | Ram et al. | |
| 2005/0131900 A1 | * | 6/2005 | Palliyll et al. | 707/10 |
| 2005/0138195 A1 | | 6/2005 | Bono | |

FOREIGN PATENT DOCUMENTS

JP   7056792 A   3/1995

* cited by examiner

*Primary Examiner*—James Trujillo
*Assistant Examiner*—Jeffrey A Burke
(74) *Attorney, Agent, or Firm*—Janaki K. Davda; Konrad Raynes and Victor LLP (57) ABSTRACT

Provided are techniques for determining whether content of an object has changed. Under control of a backup system, opaque object attributes and a data identifier are received, wherein the data identifier is generated based on one or more relevant object attributes of the opaque object attributes that indicate whether at least one of the content of the object and one or more of the relevant object attributes has changed. The received data identifier is compared with a previously stored data identifier. In response to determining that the received data identifier and the previously stored data identifier do not match, it is determined that the content of the object has changed.

12 Claims, 6 Drawing Sheets

CONTROLLING INCREMENTAL BACKUPS USING OPAQUE OBJECT ATTRIBUTES

BACKGROUND

1. Field

Embodiments of the invention relate to controlling incremental backups using object attributes.

2. Description of the Related Art

Incremental backup may be described as a process of backing up new and changed objects (e.g., files, directories, etc.), rather than backing up all objects. That is, the objects that remain unchanged since a last incremental backup are not backed up. A set of object attributes are typically associated with an object, and the set of object attributes are used to determine whether an object is a candidate for backup.

Tivoli® Storage Manager (TSM) is available from International Business Machines Corporation. TSM enables an organization to protect data from failures and other errors by storing backup data in a hierarchy of offline storage.

In some systems, the object attributes may be interpreted by backup systems. That is, the backup system understands which object attributes are relevant to determining whether incremental backup of the object should be performed. Relevant object attributes are ones that indicate that object content has changed and that incremental backup should be performed. With some backup systems, such as TSM, when the backup system determines whether to perform an incremental backup of an object, the backup system compares current object attributes of the object to previously stored object attributes at a server computer (i.e. the object attributes stored at the time of the last incremental backup). If the backup system is able to interpret the object attributes, the backup system is able to determine that a difference in certain object attributes, such as object size or modification time, indicates that the object should be backed up (i.e., that the object is to be resent to the server computer for backup), and is able to determine that differences in other object attributes, such as object ownership and permissions, indicates that metadata is to be updated on the server computer, without performing an incremental backup of the object.

Some object systems, such as a General Parallel File System (GPFS) available from International Business Machines Corporation and a Storage Area Network (SAN) Object, return object attributes as an opaque buffer to the backup system. An opaque buffer may be described as one for which the backup system does not know the structure, and, thus, is not able to interpret (i.e., the backup system is not able to identify separate object attributes in the opaque buffer). Some changed object attributes within the opaque buffer trigger incremental backup of the object, while other changed object attributes may be ignored because they do not reflect a change in object content. Since the backup system is not aware of the buffer structure, the backups system cannot distinguish object attributes that trigger incremental backup and those that can be ignored. Therefore, the backup system uses the entire opaque buffer or a checksum of the opaque buffer to determine whether to perform incremental backup of the object. This leads to unnecessary incremental backups when only object attributes that may be ignored are changed.

Instead of using an opaque buffer, object attributes may be stored in an opaque Binary Large Object (BLOB), which may also be referred to as a buffer. Using an opaque BLOB to communicate object attributes to the backup software is a technique that is too course grain. With existing backup systems, if there are object attributes included in the opaque BLOB that should not result in object content being backed up, the object system does not notify the backup system of this. Furthermore, if there are object system rich extended metadata associated with the opaque BLOB of an object, such as there is with a Storage Area Network File System (SANFS), then immaterial changes to object system state, such as which tier storage is used to store extents of an object, result in the object content being backed up unnecessarily.

A checksum may be described as a form of redundancy check. One type of checksum is a cyclic redundancy check (CRC). A CRC may be described as a type of hash function applied to data to generate a checksum, which is typically a small number of bits. The CRC is computed and appended to the data before transmission or storage. The CRC appended to the data is verified by a recipient of the data to confirm that no changes occurred on transit or in storage. CRC also enables correction of the data if information lost is lower than information held by the checksum. Thus, the CRC is used to detect and correct errors after transmission or storage.

Some backup systems use a checksum on the opaque BLOB to determine whether to perform an incremental backup. A backup system, such as TSM, receives an opaque BLOB for an object, performs a checksum on the entire opaque BLOB, and stores the checksum and the size of the opaque BLOB in a server computer repository. When another opaque BLOB is received for the object on the next backup, the backup system generates another checksum and compares this checksum to the stored checksum. In particular, if a checksum on the opaque BLOB matches the previously stored checksum on a previously received opaque BLOB, then the incremental backup is not performed as the object associated with the opaque BLOB is determined not to have changed.

Some backup systems use a checksum to detect changes to a collection of object attributes stored as an Access Control List (ACL), which includes information on access rights for an object. Again, this solution is too course grain. For example, if an ACL for an object includes the fact that the object is not READ accessible by some users, this information is not relevant to the object contents being incrementally backed up. Without detailed knowledge of the ACL, the backup system is not able to decide whether the object contents have changed or not, although some object attributes in the ACL (e.g., whether the object is READ accessible by some users) may have changed. Therefore, the backup system reacts in a conservative manner and performs an incremental backup of the object.

Some systems allow a file system to indicate to the backup system whether changes require a new incremental backup using an archive bit. However, simple changes to the metadata of an object (e.g., changing access rights in the ACL of an object) results in the archive bit being set for the object. Thus, the archive bit is too course grain in that the archive bit represents both content and metadata changes to a object.

Thus, there is a need in the art for improved incremental backups for systems in which the backup system receives an opaque buffer or BLOB.

SUMMARY OF EMBODIMENTS OF THE INVENTION

Provided are a method, computer program product, and system for determining whether content of an object has changed. Under control of a backup system, opaque object attributes and a data identifier are received, wherein the data identifier is generated based on one or more relevant object attributes of the opaque object attributes that indicate whether at least one of the content of the object and one or more of the relevant object attributes has changed. The received data identifier is compared with a previously stored data identifier. In response to determining that the received data identifier and the previously stored data identifier do not match, it is determined that the content of the object has changed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments enable a backup system to work with a file system to improve the decision-making process for determining whether to perform file and object attribute incremental backups.

Figure 1:
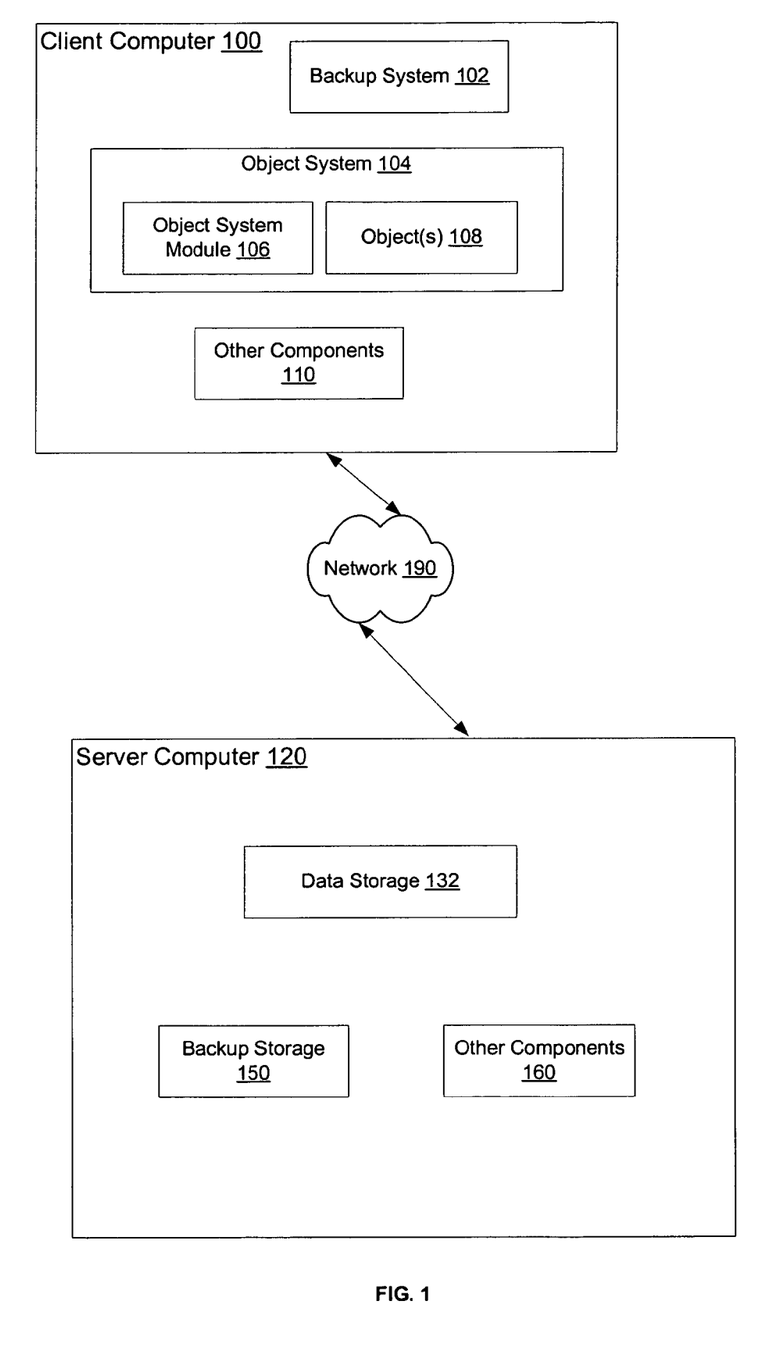
FIG. 1 illustrates details of a computing environment in accordance with certain embodiments.

FIG. 1 illustrates details of a computing environment in accordance with certain embodiments. A client computer 100 is connected via a network 190 to a server computer 120. The client computer 100 includes a backup system 102, an object system 104, and may include one or more other components 110 (e.g., client applications). The object system 104 includes an object system module 106 and one or more objects 108. In certain embodiments, the object system 104 may be a file system, the object system module 106 may be file system code, and the objects 108 may be files or directories.

The server computer 120 includes data storage 132, backup storage 150, and may include other components 160 (e.g., server applications).

In certain embodiments, the backup system 102 is capable of performing incremental backups of objects 108 to backup storage 150. In certain other embodiments, the backup system 102 is capable of performing other types of backups. The object system module 106 returns opaque object attributes to the backup system 102 for each object 108. The object attributes are said to be "opaque" with respect to the backup system 102 in that the backup system 102 does not know the structure of the object attributes and is not able to interpret the object attributes to determine which object attributes are relevant to determining whether to perform the incremental backups of objects 108. However, the object system module 106 is capable of interpreting the object attributes, and the object attributes are not "opaque" with respect to the object system module 106. The backup system 102 stores data that is used to determine whether to perform an incremental backup.

The client computer 100 and server computer 120 may comprise any computing device known in the art, such as a server, mainframe, workstation, personal computer, hand held computer, laptop telephony device, network appliance, etc.

The network 190 may comprise any type of network, such as, for example, a peer-to-peer network, spoke and hub network, Storage Area Network (SAN), a Local Area Network (LAN), Wide Area Network (WAN), the Internet, an Intranet, etc.

With embodiments, the backup system 102 gives control to the object system module 106 to identify one or more object attributes that are relevant to determining whether to perform an incremental backup of an object 108. These may be referred to as "relevant object attributes". Together with the opaque object attributes, the object system module 106 returns to the backup system 102 a data identifier that indicates whether there have been changes in one or more relevant object attributes (i.e., ones that indicate that object content has changed and that an incremental backup of the object should be performed). Examples of some relevant object attributes are those that indicate a modification of a timestamp for an object and object size for the object. In certain embodiments, the data identifier is a checksum of the relevant object attributes. In certain embodiments, the data identifier is a flag or a number. The backup system 102 compares the received data identifier to a previously stored data identifier (i.e., one that was stored in data storage 132 by the backup system 102 during a previous backup), and the backup system 102 performs an incremental backup if the received and previously stored data identifiers do not match.

In certain embodiments, backup of an object and opaque object attributes is performed when the content of the object changes and/or when relevant object attributes of the object change. Thus, relevant object attributes play a role in determination of whether an object is a candidate for backup. Even if the content of the object has not changed, but some relevant object attributes have changed, certain embodiments back up both the object and the opaque object attributes. For example, an Access Control List (ACL) may be considered a relevant object attribute, and, if the ACL changes, the object and the opaque object attributes are backed up. The embodiments illustrated in FIG. 2 back up both the object and the opaque object attributes together.

Figure 2:
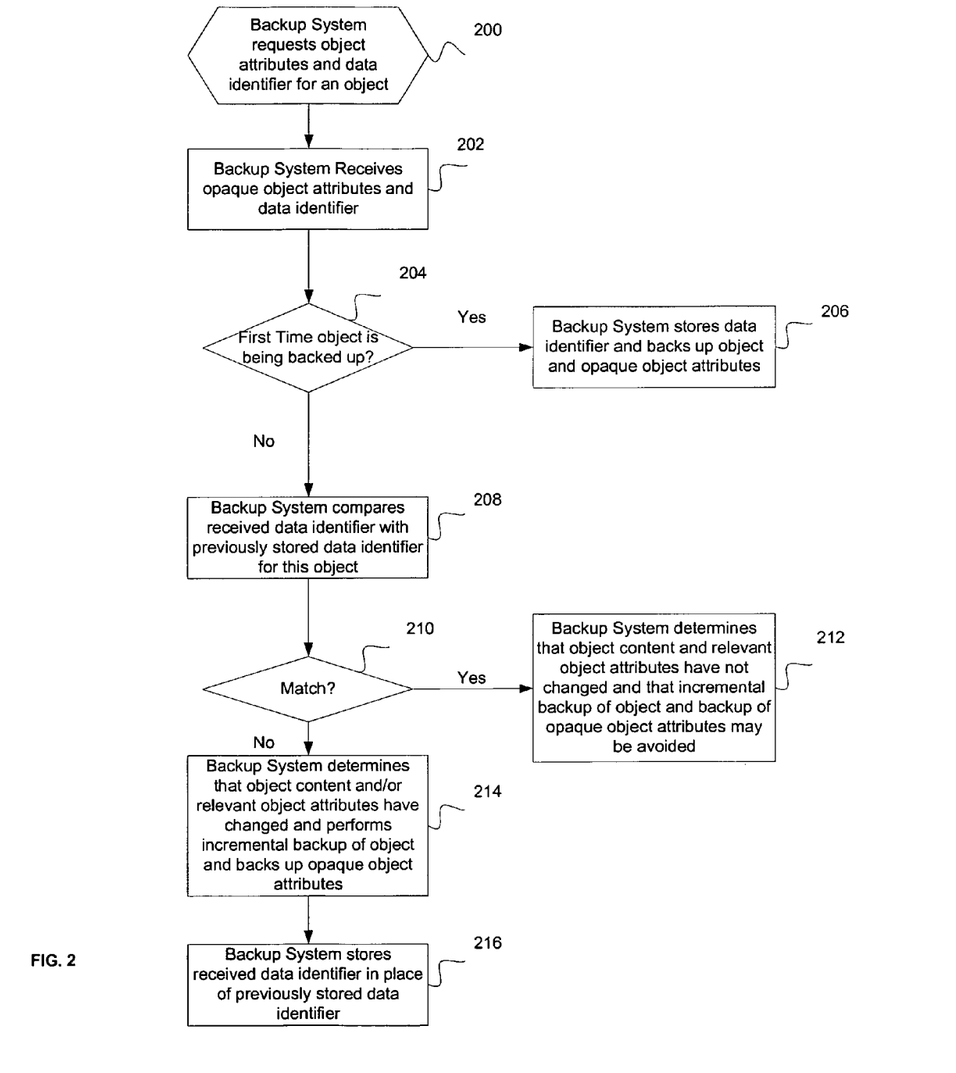
FIG. 2 illustrates logic performed by a backup system in accordance with certain embodiments.

FIG. 2 illustrates logic performed by the backup system 102 in accordance with certain embodiments. In certain embodiments, the opaque object attributes are backed up with the object when the backup system 102 determines that an incremental backup is to be performed. The logic of FIG. 2 illustrates such embodiments. Control begins at block 200 with the backup system 102 requesting object attributes and a data identifier for an object from the object system module 106. Embodiments provide a new command for making this request. In certain embodiments, the form of the command is as follows:

GetObjectAttandDataIdentifier (AttrBuffer, DataId)

The GetObjectAttandDataIdentifier (AttrBuffer, DataId) command includes parameters for storing the object attributes ("AttrBuffer") and the data identifier ("DataId").

In block 202, the backup system 102 receives opaque object attributes and the data identifier from the object system module 106. In block 204, the backup system 102 determines whether this is the first time that this object is being backed up. If so, processing continues to block 206, otherwise, processing continues to block 208. In block 206, the backup system 102 stores the data identifier in data store 132 on the server computer 120 and backs up the object along with the opaque object attributes to backup storage 150. In certain embodiments, the object and opaque object attributes have a one-to-one relationship such that, when object attributes for an object are updated, the previously stored object attributes are not relevant for that object and may be discarded. However, there may be any number of versions of the object stored at any given time along with associated opaque object attributes.

In block 208, the backup system 102 compares the received data identifier with a previously stored data identifier. In block 210, the backup system 102 determines whether there is a match. If so, processing continues to block 212, otherwise, processing continues to block 214. In block 212, the backup system 102 determines that object content and relevant object attributes have not changed and that incremental backup of the object and backup of the opaque object attributes may be avoided. In block 214, the backup system 102 determines that object content and/or one or more relevant object attributes have changed and performs an incremental backup of the object and the opaque object attributes. From block 214, processing continues to block 216. In block 216, the backup system 102 stores the received data identifier in place of the previously stored data identifier.

Figure 3:
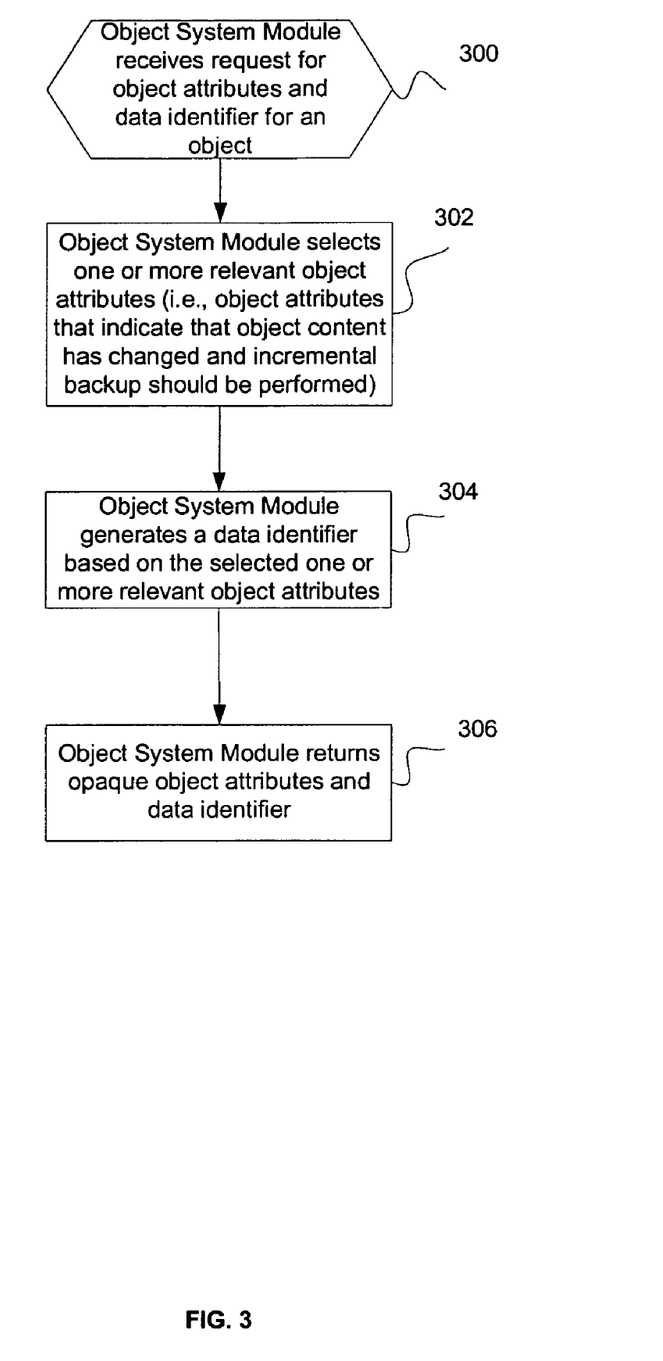
FIG. 3 illustrates logic performed by an object system module in accordance with certain embodiments.

FIG. 3 illustrates logic performed by the object system module 106 in accordance with certain embodiments. Control begins at block 300 with the object system module 106 receiving a request for object attributes and a data identifier for an object from the backup system 102. The request may be received in the form of the command: GetObjectAttandDataIdentifier (AttrBuffer, DataId). In block 302, the object system module 106 selects one or more relevant object attributes (i.e., object attributes that indicate that object content has changed and incremental backup of the object should be performed). In block 304, the object system module 106 generates a data identifier based on the selected one or more relevant object attributes. In certain embodiments, the object system module 106 generates a checksum of the selected one or more relevant object attributes. In block 306, the object system module 106 returns the opaque object attributes and the data identifier to the backup system 102.

For example, in certain embodiments, when object attributes are requested, the object system module 106 calculates a checksum on those object attributes that are considered relevant for an incremental backup. In certain embodiments, the object attributes are in a structure that is then converted to an opaque buffer that is returned to the backup system 102 together with the checksum. The backup system 102 compares this checksum to a previously stored version and decides whether the object should be incrementally backed up.

Figure 4A:
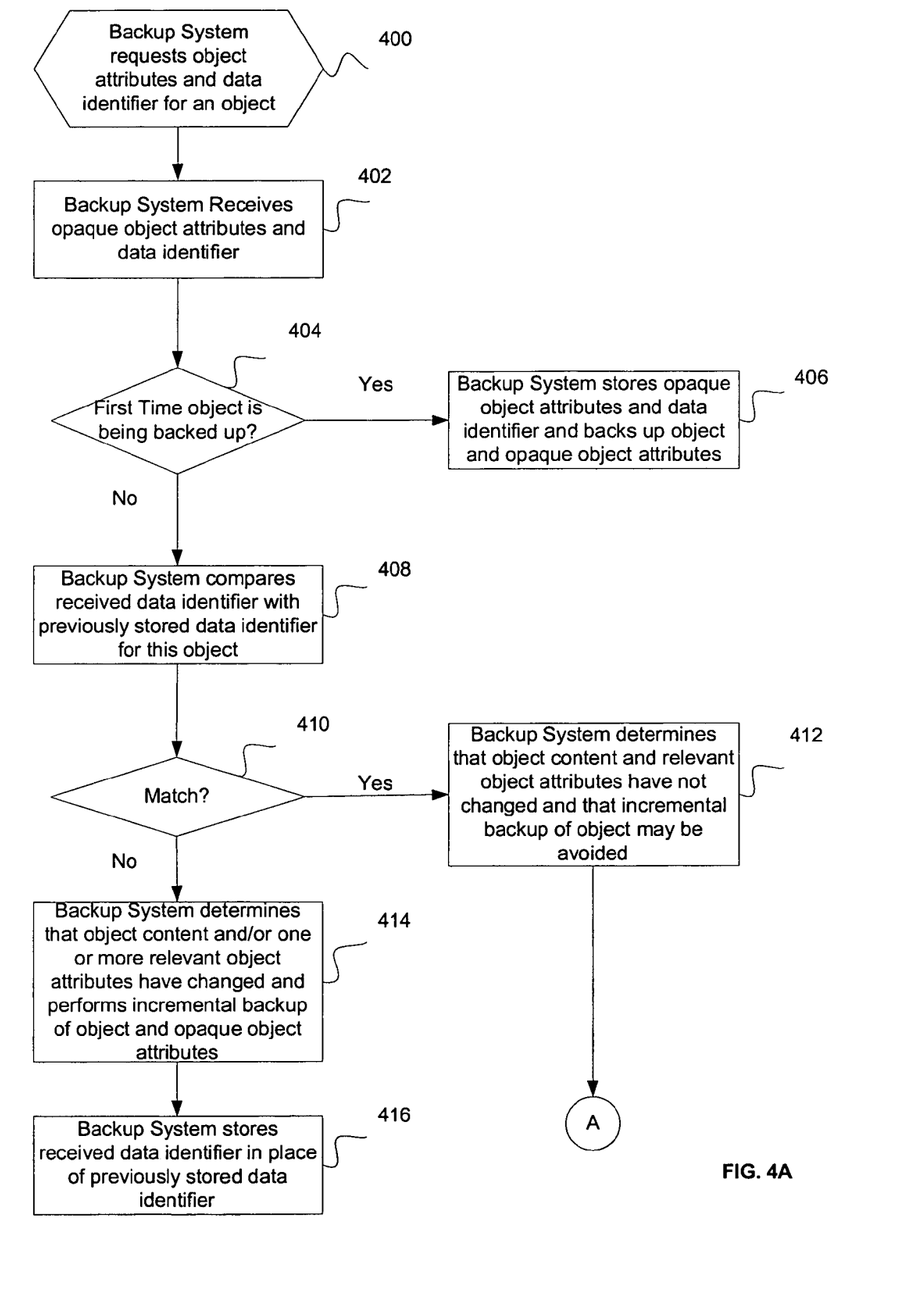
FIGS. 4A and 4B illustrate alternative logic performed by a backup system in accordance with certain embodiments.
Figure 4B:
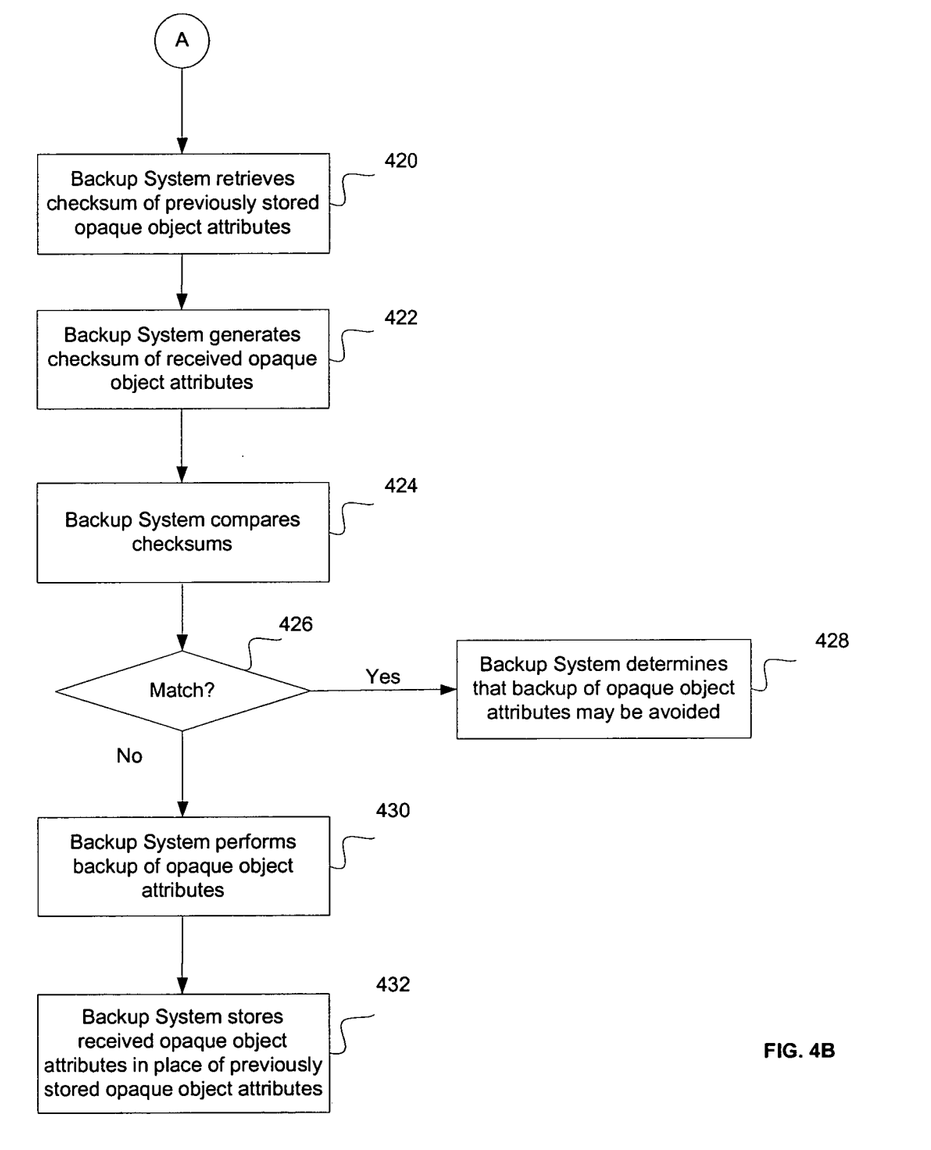

FIGS. 4A and 4B illustrate alternative logic performed by the backup system 102 in accordance with certain embodiments. In certain embodiments, the opaque object attributes may be backed up separately from the object when the backup system 102 determines that an incremental backup of the object does not need to be performed but that the opaque object attributes have been modified and should be backed up. In such embodiments, the entire set of opaque attributes are backed up rather than just the changed attributes because the object attributes are opaque with respect to the backup system 102. The logic of FIGS. 4A and 4B illustrate such embodiments.

In FIG. 4, control begins at block 400 with the backup system 102 requesting object attributes and a data identifier for an object from the object system module 106. In certain embodiments, the request is made using the new command provided by embodiments: GetObjectAttandDataIdentifier (AttrBuffer, DataId)

In block 402, the backup system 102 receives opaque object attributes and the data identifier from the object system module 106. In block 404, the backup system 102 determines whether this is the first time that this object is being backed up. If so, processing continues to block 406, otherwise, processing continues to block 408. In block 406, the backup system 102 stores the data identifier in data store 132 on the server computer 120 and backs up the object along with the opaque object attributes and a checksum of the opaque object attributes to backup storage 150. Thus, unlike the logic of FIG. 2, the checksum of the opaque object attributes is stored.

With the logic of FIG. 4, the backup system 102 compares the received data identifier with a previously stored data identifier to determine whether the object is to be backed up. Additionally, if it is determined that the object does not need to be backed up, the backup system 102 compares a checksum of the received opaque object attributes with a checksum of previously stored opaque object attributes to determine whether the opaque object attributes are to be backed up.

In block 408, the backup system 102 compares the received data identifier with a previously stored data identifier. In block 410, the backup system 102 determines whether there is a match. If so, processing continues to block 412, otherwise, processing continues to block 414. In block 414, the backup system 102 determines that object content and/or one or more relevant object attributes have changed and performs an incremental backup of the object and a backup of the opaque object attributes. In block 416, the backup system 102 stores the received data identifier in place of the previously stored data identifier.

In block 412, the backup system 102 determines that the object content and relevant object attributes have not changed and that the incremental backup of the object may be avoided. From block 412 (FIG. 4A), processing continues to block 420 (FIG. 4B).

A portion of the processing of FIG. 4B describes the determination as to whether the opaque object attributes are to be backed up separately from the object. In block 420, the backup system 102 retrieves a previously stored checksum of previously received opaque object attributes (i.e. the opaque object attributes stored at the time of the last incremental backup). In block 422, the backup system 102 generates a checksum of the received opaque object attributes. In block 424, the backup system 102 compares the checksums. In block 426, if there is a match, processing continues to block 428, otherwise, processing continues to block 430. In block 428, the backup system 102 determines that backup of the opaque object attributes may be avoided. In block 430, the backup system 102 performs backup of the opaque object attributes. In block 432, the backup system 102 stores the received opaque object attributes in place of the previously stored opaque object attributes.

In certain embodiments, the object attributes that are used by the object system 104 form a BLOB that contains ACLs for a file or directory and additional file system specific metadata. For example, if the object system 104 is a SANFS, unique file system specific object attributes for a file that indicate where a file's extents reside and how a placement policy is to be used to evaluate a file's storage placement on restore is included in the opaque object attributes. The placement policy may indicate, for example, that files with the extension .html are to be stored on high performance Small Computer System Interface (SCSI) storage for faster access, while files with the extension zip may be stored on Integrated Drive Electronics (IDE) storage. When these extended file system object attributes change, as may be possible with information life cycle management as a file moves seamlessly from one tier of storage to another, the extended file system object attributes will change to indicate the new location of the file's blocks. However, the backup system 102 does not back up the file's contents because of this migration. In particular, the object system module 106 provides a data identifier (e.g., a checksum) based on the portion of the object attributes (e.g., a portion of the BLOB) that indicates whether relevant object attributes have changed (i.e., those object attributes that would indicate that the file's content has changed and an incremental backup should be performed). Additionally, in certain embodiments, the backup system 102 backs up both the object (e.g., file), and the opaque BLOB. Thus, the opaque BLOB is backed up to reflect, for example, new storage position information within the backup application repository for later use at restore time.

With embodiments, it is not the backup system 102 that decides which object attributes should be considered for determining whether the object needs to be backed up. Instead, the object system module 106 selects the object attributes. This gives more control to the object system module 106, which is desirable because then the backup system 102 does not need to understand and interpret the entire set of object attributes, which may change if the object system 104 is changed (e.g., due to a new code release). In certain embodiments, the object attributes may be file metadata.

Also, moving the checksum calculation from the backup system 102 to the object system module 106 removes the risk of including irrelevant object attributes contained in the opaque object attributes in a checksum calculation, which could lead to unnecessary backups of the object. Instead, the object system module 106, which has the knowledge about the relevance of each object attribute is able to select one or more of the object attributes for inclusion in the checksum calculation that are relevant.

The backup system 102 or any other program external to the object system 104 is not able to modify the data identifier associated with an object (e.g., a checksum of the relevant object attributes), but the backup system 102 is able to compare the current data identifier with one that was previously stored on the server computer 120. This provides a robust approach to detect changes in relevant object attributes within opaque object attributes.

Thus, embodiments enable object content change detection by a backup system 102 that receives opaque object attributes by having the object system module 106 calculate a checksum over relevant object attributes and having the backup system 102 base the decision of whether an incremental backup of an object is needed based on this checksum.

In other words, the backup system 102 does not have to have a mechanism for interpreting the opaque buffer, and the incremental backup is controlled by the object system module 106.

Tivoli is a registered trademark or common law mark of International Business Machines Corporation in the United States and/or other countries.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3, 4A, and 4B describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, 4A, and 4B may be implemented in software, hardware, programmable and non-programmable gate array logic or in some combination of hardware, software, or gate array logic.

Figure 5:
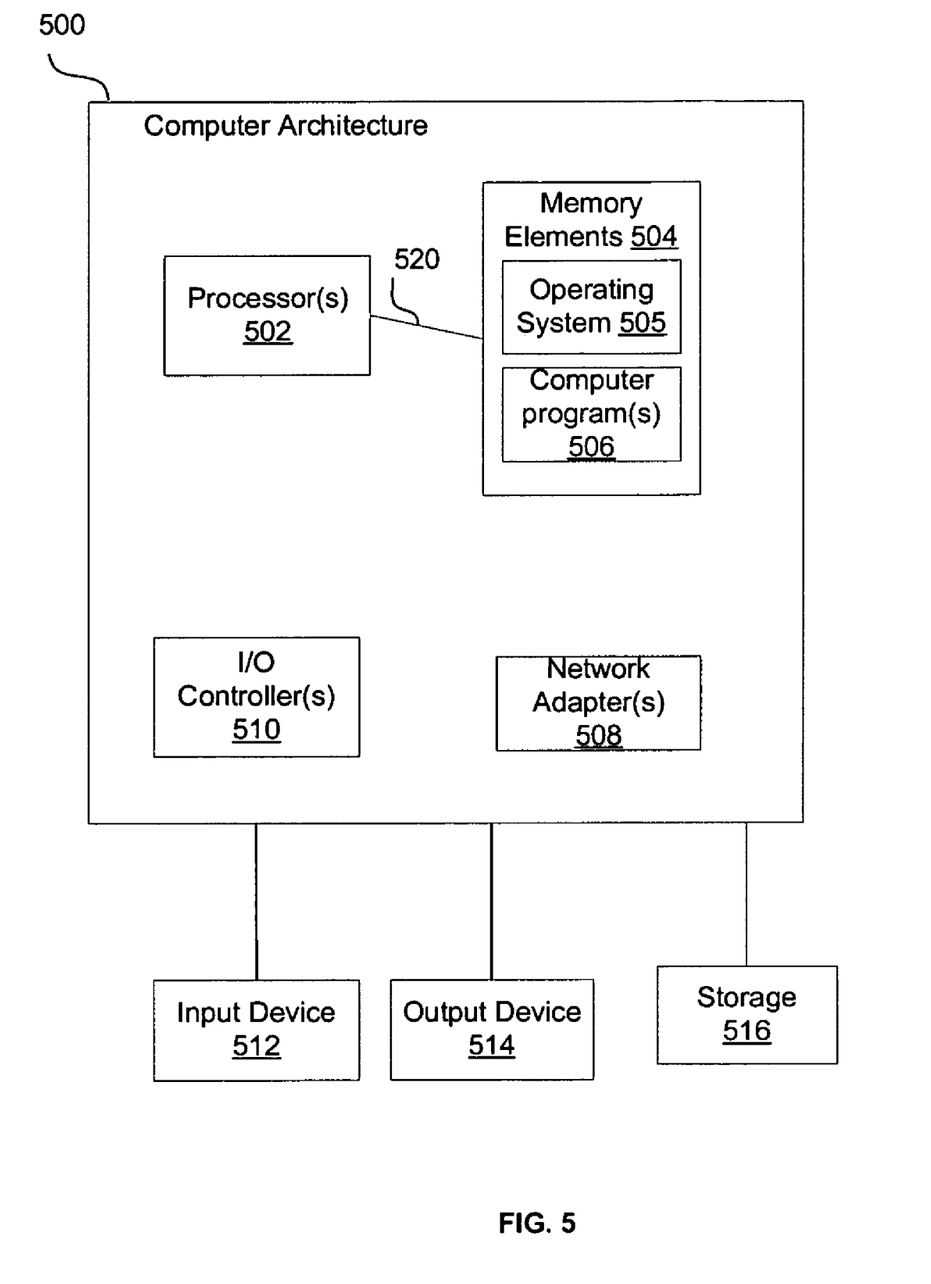
FIG. 5 illustrates an architecture of a computer system that may be used in accordance with certain embodiments.

FIG. 5 illustrates a system architecture 500 that may be used in accordance with certain embodiments. Client computer 100 and/or server computer 120 may implement system architecture 500. The system architecture 500 is suitable for storing and/or executing program code and includes at least one processor 502 coupled directly or indirectly to memory elements 504 through a system bus 520. The memory elements 504 may include local memory employed during actual execution of the program code, bulk storage, and cache memories which provide temporary storage of at least some program code in order to reduce the number of times code must be retrieved from bulk storage during execution. The memory elements 504 include an operating system 505 and one or more computer programs 506.

Input/Output (I/O) devices 512, 514 (including but not limited to keyboards, displays, pointing devices, etc.) may be coupled to the system either directly or through intervening I/O controllers 510.

Network adapters 508 may also be coupled to the system to enable the data processing system to become coupled to other data processing systems or remote printers or storage devices through intervening private or public networks. Modems, cable modem and Ethernet cards are just a few of the currently available types of network adapters 508.

The system architecture 500 may be coupled to storage 516 (e.g., a non-volatile storage area, such as magnetic disk drives, optical disk drives, a tape drive, etc.). The storage 516 may comprise an internal storage device or an attached or network accessible storage. Computer programs 506 in storage 516 may be loaded into the memory elements 504 and executed by a processor 502 in a manner known in the art.

The system architecture 500 may include fewer components than illustrated, additional components not illustrated herein, or some combination of the components illustrated and additional components. The system architecture 500 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method for determining whether content of an object has changed, comprising:
under control of a backup system executing at a client computer having a processor, requesting opaque object attributes and a data identifier by issuing a command to an object system module executing at the client computer, wherein the backup system is not able to interpret the opaque object attributes to identify opaque object attributes that are relevant to determining whether to perform incremental backup, and wherein the object system module is able to interpret the opaque object attributes to identify object attributes that are relevant to determining whether to perform the incremental backup;
under control of the object system module, generating the data identifier by:
selecting a set of relevant opaque object attributes from a set of object attributes for the object, wherein the selected set of relevant opaque object attributes indicate at least one of the content of the object or a relevant opaque object attribute has changed, wherein at least one object attribute is not relevant to determining whether to perform the incremental backup and is not in the set of relevant opaque object attributes; and
generating the data identifier by generating a checksum on the selected set of relevant opaque object attributes; and
under control of the backup system:
receiving the opaque object attributes and the data identifier from the object system module;
comparing the received data identifier with a previously stored data identifier that was previously generated by the object system module;
in response to determining that the received data identifier and the previously stored data identifier do not match, determining that the content of the object has changed; and
performing an incremental backup of the object and a backup of the opaque object attributes; and
in response to determining that the received data identifier and the previously stored data identifier do match, determining that the content of the object has not changed and that incremental backup of the content of the object does not need to be performed.

2. The method of claim 1, further comprising:
storing the received data identifier.

3. The method of claim 1, further comprising:
in response to determining that this is a first time that the object is being backed up,
storing the data identifier in a first data store; and
backing up the object and the opaque object attributes to a second data store.

4. The method of claim 1, further comprising:
in response to determining that the received data identifier and the previously stored data identifier do match,
generating a first checksum of the received opaque object attributes;
retrieving a second checksum of previously stored opaque object attributes; and
in response to determining that the first checksum and the second checksum do not match, backing up the opaque object attributes separate from the object.

5. A computer program product for determining whether content of an object has changed comprising a computer readable storage medium including a computer readable program, wherein the computer readable program when executed by a processor on a client computer causes the computer to:
under control of a backup system executing at the client computer, request opaque object attributes and a data identifier by issuing a command to an object system module executing at the client computer, wherein the backup system is not able to interpret the opaque object attributes to identify opaque object attributes that are relevant to determining whether to perform incremental backup, and wherein the object system module is able to interpret the opaque object attributes to identify object attributes that are relevant to determining whether to perform the incremental backup;

under control of the object system module, generate the data identifier by: selecting a set of relevant opaque object attributes from a set of object attributes for the object, wherein the selected set of relevant opaque object attributes indicate at least one of the content of the object or a relevant opaque object attribute has changed, wherein at least one object attribute is not relevant to determining whether to perform the incremental backup and is not in the set of relevant opaque object attributes; and generating the data identifier by generating a checksum on the selected set of relevant opaque object attributes; and under control of the backup system:

receive the opaque object attributes and the data identifier from the object system module;

compare the received data identifier with a previously stored data identifier that was previously generated by the object system module;

in response to determining that the received data identifier and the previously stored data identifier do not match, determine that the content of the object has changed; and performing an incremental backup of the object and a backup of the opaque object attributes; and in response to determining that the received data identifier and the previously stored data identifier do match, determining that the content of the object has not changed and that incremental backup of the content of the object does not need to be performed.

6. The computer program product of claim 5, wherein the computer readable program when executed on a computer causes the computer to:

store the received data identifier.

7. The computer program product of claim 5, wherein the computer readable program when executed on a computer causes the computer to:

in response to determining that this is a first time that the object is being backed up, store the data identifier in a first data store; and back up the object and the opaque object attributes to a second data store.

8. The computer program product of claim 5, further comprising:

in response to determining that the received data identifier and the previously stored data identifier do match, generate a first checksum of the received opaque object attributes;

retrieve a second checksum of previously stored opaque object attributes; and in response to determining that the first checksum and the second checksum do not match, back up the opaque object attributes separate from the object.

9. A system for determining whether content of an object has changed, comprising:

hardware logic at a client computer implementing operations to:

under control of a backup system at the client computer, request opaque object attributes and a data identifier by issuing a command to an object system module at the client computer, wherein the backup system is not able to interpret the opaque object attributes to identify opaque object attributes that are relevant to determining whether to perform incremental backup, and wherein the object system module is able to interpret the opaque object attributes to identify object attributes that are relevant to determining whether to perform the incremental backup;

under control of the object system module, generate the data identifier by:

selecting a set of relevant opaque object attributes from a set of object attributes for the object, wherein the selected set of relevant opaque object attributes indicate at least one of the content of the object or a relevant opaque object attribute has changed, wherein at least one object attribute is not relevant to determining whether to perform the incremental backup and is not in the set of relevant opaque object attributes; and generating the data identifier by generating a checksum on the selected set of relevant opaque object attributes; and under control of the backup system:

receive the opaque object attributes and the data identifier from the object system module;

compare the received data identifier with a previously stored data identifier that was previously generated by the object system module;

in response to determining that the received data identifier and the previously stored data identifier do not match, determine that the content of the object has changed; and performing an incremental backup of the object and a backup of the opaque object attributes; and in response to determining that the received data identifier and the previously stored data identifier do match, determining that the content of the object has not changed and that incremental backup of the content of the object does not need to be performed.

10. The system of claim 9, wherein the backup system is adaptable to store the received data identifier.

11. The system of claim 9, wherein the backup system is adaptable to, in response to determining that this is a first time that the object is being backed up, store the data identifier in a first data store and back up the object and the opaque object attributes to a second data store.

12. The system of claim 9, wherein the backup system is adaptable to, response to determining that the received data identifier and the previously stored data identifier do match, generate a first checksum of the received opaque object attributes, retrieve a second checksum of previously stored opaque object attributes, and in response to determining that the first checksum and the second checksum do not match, back up the opaque object attributes separate from the object.

* * * * *